United States Patent [19]

Stenger et al.

[11] Patent Number: 5,480,690
[45] Date of Patent: Jan. 2, 1996

[54] MULTI-LAYER POLYAMIDE-BASED PACKAGING CASING

[75] Inventors: Karl Stenger, Ruedesheim; Ludwig Klenk, Oestrich-Winkel; Dieter Beissel, Wiesbaden, all of Germany

[73] Assignee: Hoechst Aktiengesellschaft, Frankfurt am Main, Germany

[21] Appl. No.: 127,138

[22] Filed: Sep. 27, 1993

Related U.S. Application Data

[63] Continuation of Ser. No. 642,852, Jan. 18, 1991, abandoned.

[30] Foreign Application Priority Data

Jan. 20, 1990 [DE] Germany .................. 40 01 612.9

[51] Int. Cl.⁶ .................. B65D 85/72; B65D 81/34
[52] U.S. Cl. .................. 428/34.8; 428/35.2; 428/200; 428/474.7; 428/474.9; 428/475.2; 428/476.1; 138/118.1; 426/105; 426/127; 426/129
[58] Field of Search .................. 428/34.8, 474.7, 428/474.9, 475.2, 475.5, 475.8, 476.1, 36.91, 35.4, 35.2, 220; 138/118.1; 426/127, 105, 129

[56] References Cited

U.S. PATENT DOCUMENTS

| | | | |
|---|---|---|---|
| 4,557,780 | 12/1985 | Newsome | 428/475.5 |
| 4,647,483 | 3/1987 | Tse | 428/474.7 |
| 4,883,693 | 11/1989 | Ohya | 428/35.4 |
| 4,908,272 | 3/1990 | Harada et al. | 428/412 |
| 4,911,963 | 3/1990 | Lustig | 428/36.91 |
| 5,326,613 | 7/1994 | Stenger | 428/34.8 |

FOREIGN PATENT DOCUMENTS 0104436  4/1984  European Pat. Off. .

*Primary Examiner*—Ellis P. Robinson
*Assistant Examiner*—Rena L. Dye
*Attorney, Agent, or Firm*—Foley & Lardner

[57] ABSTRACT

The biaxially stretch-oriented multi-layer tubular packaging casing for packaging pasty products, in particular the artificial sausage casing, includes a barrier layer having a reduced permeability to oxygen, an outer layer and an inner layer. The barrier layer comprises a partially aromatic polyamide and/or copolyamide, the outer and inner layers an aliphatic polyamide or copolyamide or a polymer mixture of at least one of the two compounds.

28 Claims, No Drawings

MULTI-LAYER POLYAMIDE-BASED PACKAGING CASING

This application is a continuation of application, Ser. No. 07/642,852, filed Jan. 18, 1991, now abandoned.

BACKGROUND OF THE INVENTION

The present invention relates to a polyamide-based biaxially stretch-oriented multi-layer tubular packaging casing for packaging pasty products, in particular, an artificial sausage casing.

Polyamide-based biaxially stretch-oriented multi-layer packaging casings generally are known in the art. The multi-layer tubular artificial sausage casing disclosed in DE-A-27 24 252, for example, comprises an inner layer made of a polymer mixture of polyamide-6 ("PA-6") and polyolefin to improve its barrier characteristics. The film forming this prior art casing is optionally oriented in at least one direction.

From the state of the art (EP-A-0 065 278) it is also known that a biaxially stretch-oriented multi-layer film having high shrinking capacity, e.g., the type of film required for vacuum forming containers under the application of heat, is provided with a polyamide layer comprising a mixture of an aliphatic polyamide or copolyamide and a partially-aromatic polyamide or copolyamide. The partially-aromatic polyamide comprises aliphatic diamine units and aromatic dicarboxylic acid units and serves to enhance the shrinking capacity of the film over that of a film of a purely aliphatic polyamide. To improve the impermeability to water vapor the polyamide layer is combined with a layer comprising polyolefins. Polyolefinic layers, however, are unsuitable for use in sausage casings, because they would give rise to separation of the casing from the sausage meat packaged therein. In addition, high shrinkage of the film upon the application of heat is not required, and is usually disadvantageous in sausage casings.

EP-A-0 288 972 describes a multi-layer film which is extruded in the form of a web and is provided with a gas barrier layer of a partially-aromatic copolyamide comprising aliphatic and aromatic dicarboxylic acid units and aromatic diamine units. The preferred five-layer film has surface layers formed of polyolefins, a polyester, a polycarbonate or a copolyamide of PA-6 and PA-66. The film is intended for use in manufacturing bags or containers, such as bottles or cups. Compared with copolyamides comprising only aliphatic dicarboxylic acid units and aromatic diamine units, utilization of the copolyamide as the gas barrier layer in this film is stated to result in a film which exhibits a reduced amount of shrinkage under the influence of heat.

EP-A-0 305 959 discloses a multi-layer film which is intended for packaging meat and poultry, for example, in the form of a heat-sealable bag. The film has an oxygen barrier layer of an amorphous, partially-aromatic copolyamide comprising units of hexamethylenediamine, terephthalic acid and isophthalic acid. In addition, heat-sealable surface layers are present on both film surfaces, which are intended to form a barrier to water vapor to prevent moisture from the packaged product from penetrating into the copolyamide core layer. Polyolefins are mentioned as suitable surface layers, but these are disadvantageous for use in sausage casings, since they produce an inadequate adhesion between the sausage meat and the internal wall of the sausage casing.

SUMMARY OF THE INVENTION

Accordingly, it is an object of the present invention to provide a polyamide-based multi-layer tubular packaging casing that exhibits enhanced barrier characteristics with respect to oxygen and water vapor and, consequently, can be employed without an additional polyolefin layer. It should be possible to use the casing without difficulty as an artificial sausage casing, especially for scalded and cooked sausages. Even after having been stored for six weeks, sausages packaged in the casing should not show any noticeable loss of moisture, which would become apparent in a reduction of the filling diameter and a wrinkled sausage and, what is more, jelly should not settle between the casing wall and sausage meat as a result of the casing separating from the sausage meat.

In accomplishing the foregoing objects, there is provided according to the present invention a polyamide-based biaxially stretch-oriented multi-layer tubular packaging casing, wherein said casing includes a barrier layer with reduced oxygen permeability, an outer layer disposed on a first surface of said barrier layer and an inner layer disposed on a second surface of said barrier layer, said barrier layer comprising at least one polymer selected from the group consisting of a partially-aromatic polyamide and a partially aromatic copolyamide, and said outer and inner layers comprising a material selected from the group consisting of an aliphatic polyamide, an aliphatic copolyamide and a polymer mixture which includes at least one aliphatic polyamide or aliphatic copolyamide.

In a first embodiment of the present invention, the partially-aromatic polyamide or copolyamide comprises at least one aliphatic diamine unit and at least one aromatic dicarboxylic acid unit.

In a second embodiment of the present invention, the partially-aromatic polyamide or copolyamide comprises at least one aromatic diamine unit and at least one aliphatic dicarboxylic acid unit.

Further objects, features and advantages of the present invention will become apparent from the detailed description of preferred embodiments that follows.

DETAILED DESCRIPTION OF THE PREFERRED EMBODIMENTS

The packaging casing according to the present invention comprises at least three layers—a central barrier layer and one layer each disposed on the two surfaces of the barrier layer and forming the inner and the outer layers of the tubular casing. The outer and the inner layer are made of the same material or of different materials. Relative to the group of polyamide casings having good barrier characteristics, the packaging casing of the present invention has a comparatively thin wall which preferably has a maximum thickness of about 60 µm, preferably about 50 µm, in particular of about 45 µm. Preferably, the lower limit of the wall thickness is about 30 µm, in particular about 40 µm. The barrier layer has a thickness of not more than about 50%, in particular not more than about 40%, of the total wall thickness of the packaging casing. The tubing diameter is selected according to the intended application. If the casing is used for packaging cooked and scalded sausages, the tubing diameter generally ranges from about 30 to 150 mm, particularly from about 40 to 135 mm.

The barrier layer according to the present invention comprises a partially-aromatic polyamide and/or partially-aromatic copolyamide. The partially-aromatic polyamide or copolyamide includes aliphatic and aromatic units.

In a first embodiment of the barrier layer, diamine units form predominantly or exclusively the aromatic units of the partially-aromatic polyamide or copolyamide. Examples of these units are xylylenediamine and phenylenediamine units. The dicarboxylic acid units of this embodiment, on the other hand, are predominantly or exclusively aliphatic and usually include about 4 to 10 carbon atoms. Preferred aliphatic dicarboxylic acid units include sebacic acid and azelaic acid, particularly preferred is adipic acid.

In a second embodiment of the barrier layer, diamine units form predominantly or exclusively the aliphatic units of the partially-aromatic polyamide, whereas the dicarboxylic acid units comprise predominantly or exclusively radicals of aromatic dicarboxylic acids, in particular isophthalic acid and terephthalic acid. The aliphatic diamine units generally include about 4 to 8 carbon atoms, preferably caprolactam and/or hexamethylenediamine units. The preferred partially-aromatic copolyamide of the second embodiment comprises caprolactam and/or hexamethylenediamine units and terephthalic acid and/or isophthalic acid units.

In the first embodiment, the partially-aromatic polyamide or copolyamide optionally contains up to 5 mol % of aliphatic diamine units and up to 5 mol % of aromatic dicarboxylic acid units. Similarly, in the second embodiment, the partially aromatic polyamide or copolyamide can contain up to 5 mol % of aromatic diamine units and up to 5 mol % of aliphatic dicarboxylic acid units.

The barrier layer may also include additional polyamides. The partially-aromatic polyamide or copolyamide corresponding to the above-described second embodiment is, in particular, present in a mixture with a saturated linear aliphatic polyamide and/or a saturated linear aliphatic copolyamide. A casing having a barrier layer formed of this polyamide mixture is particularly readily biaxially stretchable. The linear aliphatic polyamide in the polymer mixture of the barrier layer can comprise the reaction product of an aliphatic dicarboxylic acid with aliphatic primary diamines. Preferred dicarboxylic acids are, for example, adipic acid, azelaic acid, sebacic acid and dodecanedicarboxylic acid; preferred diamines are tetra-, penta-, hexa-, and octamethylenediamine, particular preference is given to hexamethylenediamine. The linear aliphatic polyamide included in the polyamide mixture can also be formed of units of ω-aminocarboxylic acids containing 6 to 12 carbon atoms or the lactams thereof, for example, 11-aminoundecanoic acid, caprolactam or lauric lactam. The copolyamides mixed with the partially-aromatic polyamide or copolyamide include various mixtures of the above-described aliphatic polyamide units. A preferred aliphatic copolyamide comprises caprolactam, hexamethylenediamine and adipic acid units. Particularly preferred are polyamide-6, polyamide-66 and polyamide-6/66 for use as an additional component in the barrier layer. The additional polyamide is present in the barrier layer in an amount of about 30 to 95% by weight, particularly about 40 to 60% by weight, relative to the weight of the polymer mixture.

The outer and the inner layers of the packaging tubing according to the present invention comprise a saturated linear aliphatic polyamide and/or a saturated linear aliphatic copolyamide having a composition similar to the above-described additional polyamide mixed with the partially-aromatic polyamide or copolyamide of the barrier layer. The aliphatic polyamide comprises, in particular, polyamide-6, polyamide-66, polyamide-11 or polyamide-12; the aliphatic copolyamide particularly is formed of units of polyamide-6 and/or units of polyamide-12 and is, for example, copolyamide-6/66. In a further embodiment, at least one of the two layers, preferably the outer layer, is made of a polymer mixture comprising at least one of the above-specified polyamides and/or copolyamides. The polymer mixture may also include polyolefins, ionomers or polyesters as further polymers.

The polyolefin advantageously utilized in the present invention is a homopolymer or copolymer of ethylene, propylene or α-olefins having about 4 to 8 carbon atoms, preferably polyethylene, in particular LDPE and LLDPE. As is known, ionomers are polyolefins containing carboxyl radicals, i.e., groups comprising acids, esters, anhydrides and salts of carboxylic acids. The polyolefin and the ionomer are usually included in the inner and/or outer layer of the packaging casing in a maximum amount of about 10% by weight.

The polyester which is present in the polymer mixture of the outer and/or inner layer of the packaging tube is a condensation product obtained from diols and aromatic dicarboxylic acids, in particular terephthalic acid and, if appropriate, additionally isophthalic acid. The polyester can be modified with small amounts of aliphatic dicarboxylic acids, such as adipic acid. The diols are, in particular, aliphatic compounds represented by the formula $HO-(CH_2)_n-OH (n=2-8)$, for example, ethylene glycol, 1,4-butylene glycol, 1,3-propylene glycol or hexamethylene glycol, and alicyclic compounds, such as 1,4-cyclohexanedimethanol. Polybutylene terephthalate is a particularly preferable component of the polymer mixture. The amount of polyester employed varies, in general, between about 5 and 25% by weight, relative to the polymer mixture of the outer or inner layer of the packaging casing.

In a preferred embodiment, the outer layer of the tubular packaging casing has a higher water absorption than the inner layer, which means that the casing, when used as a sausage casing, is readily soaked in water prior to the stuffing operation and has the required suppleness. The inner layer, on the other hand, which shows a reduced water absorption, enhances the barrier characteristics of the central layer. Polyamide-6 and polyamide-66, optionally mixed with other water-absorptive polymers, and/or a polyester, are thus particularly suitable for use as the outer layer. Addition of polyester facilitates biaxial stretching of the tubing, i.e., the required stretching force is unexpectedly reduced. For the inner layer, polyamides having relatively long methylene chains, for example, polyamide-11, polyamide-12 or copolyamides are used. Addition of ionomers to the inner layer improves adhesion of the casing to the sausage meat.

The individual layers of the tubular film according to the present invention may include further additives, such as inert fillers, dyes, pigments, slip agents, stabilizers and auxiliary substances which ensure a trouble-free preparation process or further processing as a sausage casing.

The present film typically is prepared by coextruding the polymers forming the individual layers through an annular die. The film thereafter is stretched in the longitudinal and transverse directions at a temperature of about 75° to 95° C. Preferably, a stretch ratio of about 2.4 to 2.8 is employed in the longitudinal direction and a stretch ratio of about 2.8 to 3.5 is used in the transverse direction. Simultaneous stretching is preferred, i.e., for stretching in the transverse direction air pressure is applied and for stretching in the longitudinal direction nip rollers rotating at different speeds are used. The film is then optionally heat-set, a temperature of about 120° to 140° C. being normally required for this treatment. Due to heat setting, the film exhibits a relatively low shrinkage of less than about 20%, particularly less than about 15%, in the longitudinal and transverse directions, when it is subjected to temperatures of up to about 90° C.

The examples given below demonstrate the advantage of the casing according to the present invention over non-oriented or oriented monolayer tubular casings of polyamide.

Example 1

By coextruding through an annular slot die at an extrusion temperature of 240° C. a product having the structure outer layer: PA-6(®Ultramid B4)

central layer: N-MXD 6(®Nyref 6001)

inner layer: PA-6(®Ultramid B4)

was formed and then quenched to give a cast tubing having a diameter of 19 mm and a wall thickness of 0.39 mm. N-MXD 6 is a polycondensation product of meta-xylylene diamine (MXDA) with adipic acid. The cast tubing was then heated and simultaneously biaxially stretched within the stretching zone. In the stretching process, the following stretch ratios were observed:

transverse stretch ratio: 1:3.0 longitudinal stretch ratio: 1:2.6

In this manner, an oriented three-layer tubular film was obtained which had a diameter of 57 mm and a wall thickness of 50 μm, wherein the individual layers had the following thicknesses:

outer layer: 20 μm central layer: 20 μm inner layer: 10 μm

In a further process step, the casing was heat-set with the aid of a further inflating operation to avoid longitudinal and transverse shrinkage. The tubular film thus obtained was no longer capable of shrinking at temperatures below 80° C., but was highly transparent and had a high strength. Converting the film into a sausage casing and stuffing the casing with sausage meat presented no difficulties. Following scalding and cooling tightly-encased sausages were obtained.

Comparative Example 1

Example 1 was repeated, except that extrusion of the central and inner layers was stopped and discharge of the outer layer was increased, which resulted in a cast tubing of 0.3 mm wall thickness and, eventually, in an oriented PA-6 monolayer tubular casing.

Comparative Example 2

A blown tubing of a PA-66 (®Ultramid A5) having a flat width of 98 mm and an average wall thickness of 47 μm was prepared in a vertical film blowing unit in a downhill operation and at an extrusion temperature of 280° C.

TABLE 1

Basic Properties of Casings

|  | Wall Thickness [μm] | Flat Width [mm] | Tensile Strength at Break long/transv. [N/mm$^2$] | Elongation at Break long./transv. [%] | Permeability to Water Vapor [g/m$^2$d] | O$_2$-Permeation [cm$^3$m$^2$* d-bar] |
|---|---|---|---|---|---|---|
| Example | 50 | 88 | 115/190 | 158/82 | 9.5 | 10 |
| Comparative Example 1 | 39 | 94 | 178/268 | 160/80 | 17.0 | 17 |
| Comparative Example 2 | 47 | 98 | 79/74 | 276/305 | 13 | 28 |

The following methods were used to determine the technical data:

| Test Value | Test Standard |
|---|---|
| Tensile Strength at Break: | DIN 53 455 |
| Elongation at Break: | DIN 53 455 |
| Permeability to Water Vapor: | DIN 53 122 |
| O$_2$-Permeation: | DIN 53 380 |

TABLE 2

Application-Related Test of Casings
(product filled-in: liver sausage composition, 1000 g)

|  | Stuffing Behavior | Visual Assessment after Preparation of Sausage | Weight Loss per Week [%] | Visual Assessment after Storing for 6 Weeks in an Illuminated Refrigerated Showcase |
|---|---|---|---|---|
| Example 1 | could be stuffed tightly; cylindrical sausage of uniform diameter | ends of semi-circular shape, wrinkle-free, tight | 0.6 | slight loss of color of sausage meat |
| Comparative Example 1 | same as above | ends of semi-circular shape, wrinkle-free, tight | 1.2 | surface of sausage meat turned gray; |

TABLE 2-continued

Application-Related Test of Casings
(product filled-in: liver sausage composition, 1000 g)

| | Stuffing Behavior | Visual Assessment after Preparation of Sausage | Weight Loss per Week [%] | Visual Assessment after Storing for 6 Weeks in an Illuminated Refrigerated Showcase |
|---|---|---|---|---|
| Comparative Example 2 | could not be stuffed tightly, in particular at thin places of casing; bulge formation; non-cylindrical sausage | poor end formation; long ends; wrinkle-free, but limp | 0.8 | some brown patches due to drying out, wrinkly sausage surface of sausage meat turned gray; green coloration at thin places of casing; wrinkly sausage |

Upon comparison of the data shown in the tables, the advantage of the tubular casing of the embodiment of the present invention corresponding to Example 1 is evident. The casings of the comparative examples may have good properties in certain individual categories, but neither of these casings meets all the following requirements of:

| | |
|---|---|
| Strength of casing and stability of diameter | (no bulging during the stuffing and scalding operation; no formation of long ends; resistance to clip-fastening) |
| Close fitting to sausage meat | (no wrinkle-formation) |
| Good barrier characteristics | (small weight loss; sausage meat does not turn gray due to the influence of oxygen and light) |

The inventive biaxially stretch-oriented PA-multi-layer casing with centrally disposed barrier layer, as described in Example 1, proves to be a sausage casing which meets all of these requirements.

What is claimed is:

1. polyamide-based biaxially stretch-oriented multi-layer tubular packaging casing for packaging pasty products, having a wall thickness of about 30 to 60 microns, wherein said casing includes a barrier layer with reduced oxygen permeability, an outer layer disposed on a first surface of said barrier layer, and an inner layer disposed on a second surface of said barrier layer, said barrier layer comprising a polymer admixture, therein 30 to 95% by weight, relative to the weight of the polymer admixture of the barrier layer is at least one of a saturated linear aliphatic polyamide or saturated linear aliphatic copolyamide; in admixture with at least one polymer selected from the group consisting of a partially-aromatic polyamide and a partially-aromatic copolyamide, wherein said partially aromatic polyamide or partially aromatic copolyamide consists essentially of, in a first embodiment, diamine units, of which at least 95 mole-% are aromatic and, optionally up to 5 mole-% aliphatic, and dicarboxylic acid units, of which at leas 95 mole-% are aliphatic and, optionally, up to 5 mole-% are aromatic or, in a second embodiment, b) diamine units, of which least 95 mol % are aliphatic and, optionally, up to 5 mole-% are aromatic, and dicarboxylic acid units, of which at least 95 mole-% are aromatic and, optionally, up to 5 mole-% are aliphatic, and said outer and inner layers comprising a material selected from the group consisting of a saturated aliphatic polyamide, a saturated aliphatic copolyamide and a first polymer mixture which includes at least one saturated aliphatic polyamide or saturated aliphatic copolyamide, wherein said casing is formed by coextruding the polymers forming the individual layers through an annular die.

2. A packaging casing according to claim 1, wherein said outer and inner layers comprise the same material.

3. A packaging casing according to claim 1, wherein said outer and inner layers comprise different materials.

4. A packaging casing according to claim 1, wherein said partially-aromatic polyamide or copolyamide comprises at least one aliphatic diamine unit and at least one aromatic dicarboxylic acid unit.

5. A packaging casing according to claim 4, wherein said partially-aromatic polyamide or copolyamide comprises less than or equal to 5 mol % of aromatic diamine units and less than or equal to 5 mol % of aliphatic dicarboxlic acid units.

6. A packaging casing according to claim 4, wherein said aliphatic diamine comprises at least one unit selected from the group consisting of a caprolactam unit and a hexamethylene diamine unit.

7. A packaging casing according to claim 4, wherein said aromatic dicarboxylic acid comprises at least one unit selected from the group consisting of an isophthalic acid unit and a terephthalic acid unit.

8. A packaging casing according to claim 1, wherein said partially-aromatic polyamide or copolyamide comprises at least one aromatic diamine unit and at least one aliphatic dicarboxylic acid unit.

9. A packaging casing according to claim 8, wherein said partially-aromatic polyamide or copolyamide comprises less than or equal to 5 mol % of aromatic dicarboxylic acid units and less than or equal to 5 mol % of aliphatic diamine units.

10. A packaging casing according to claim 9, wherein said barrier layer consists of a polyamide which consists of the polycondensation product of metaxylenediamine with adipic acid.

11. A packaging casing according to claim 8, wherein said aromatic diamine comprises at least one unit selected from the group consisting of a xylylenediamine unit and a phenylenediamine unit.

12. A packaging casing according to claim 8, wherein said aliphatic dicarboxylic acid comprises at least one unit selected from the group consisting of a sebacic acid unit, an azelaic acid unit and an adipic acid unit.

13. A packaging casing according to claim 1, wherein said barrier layer comprises a saturated linear polyamide formed from the reaction of an aliphatic dicarboxylic acid and an aliphatic primary diamine or a copolyamide formed from a mixture of these units.

14. A packaging casing according to claim 1, wherein the saturated linear aliphatic polyamide or saturated linear aliphatic copolyamide of the barrier layer comprises caprolactam, hexamethylenediamine, and adipic acid units.

15. A packaging casing according to claim 1, wherein the saturated linear aliphatic polyamide or saturated linear aliphatic copolyamide of the barrier layer comprises polyamide-6, polyamide-66, or polyamide 6/66.

16. A packaging casing according to claim 1, wherein said barrier layer has a thickness of not more than about 50% of the total wall thickness of the packaging casing.

17. A packaging casing according to claim 16, wherein said barrier layer has a thickness of not more than about 40% of the total wall thickness of the packaging casing.

18. A packaging casing according to claim 1, wherein the wall thickness of said casing is about 40 to 50 μm.

19. A packaging casing according to claim 18, wherein the wall thickness of said casing is not more than about 45 μm.

20. A packaging casing according to claim 1, wherein the tubing diameter is about 30 to 150 mm.

21. A packaging casing according to claim 20, wherein the tubing diameter is about 40 to 135 mm.

22. A packaging casing according to claim 1, wherein said outer and inner layers comprise a material selected from the group consisting of a polyamide-6, polyamide-66, polyamide-11, polyamide-12, an aliphatic copolyamide having at least one unit of polyamide-6, polyamide-66, or polyamide-12, and a second polymer mixture thereof.

23. A packaging casing according to claim 22, wherein at least one of said outer and inner layers comprise said second polymer mixture which comprises at least one component selected from the group consisting of a polyester, a polyolefin, and an ionomer.

24. A packaging casing according to claim 23, wherein said component comprises polybutylene terephthalate.

25. A packaging casing according to claim 23, wherein said component comprises polyethylene.

26. A packaging casing according to claim 1, wherein said casing comprises a three-layer coextruded tubular film which has been stretched at a stretch ratio of about 2.4 to 2.8 in the longitudinal direction and about 2.8 to 3.5 in the transverse direction.

27. A sausage casing comprising a tubular packaging casing according to claim 1.

28. Sausage packaged with a casing according to claim 1.

* * * * *